Figure 1:
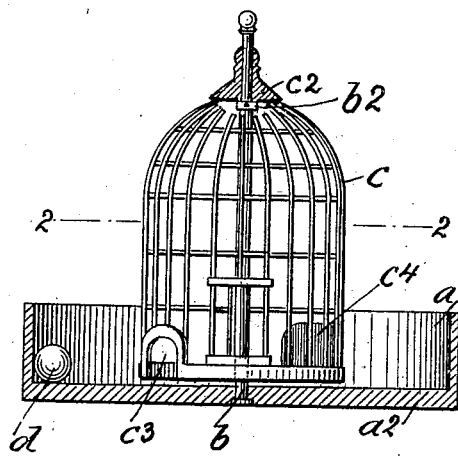

No. 832,614. PATENTED OCT. 9, 1906.
R. M. LEA.
PUZZLE.
APPLICATION FILED JUNE 26, 1906.

WITNESSES

INVENTOR
Richard M. Lea,
BY Edgar Tate & Co.
ATTORNEYS

UNITED STATES PATENT OFFICE.

RICHARD M. LEA, OF EAST ORANGE, NEW JERSEY.

PUZZLE.

No. 832,614.

Specification of Letters Patent.

Patented Oct. 9, 1906.

Application filed June 26 1906. Serial No. 323,445.

*To all whom it may concern:*

Be it known that I, RICHARD M. LEA, a citizen of the United States, residing at East Orange, in the county of Essex and State of New Jersey, have invented certain new and useful Improvements in Puzzles, of which the following is a specification, such as will enable those skilled in the art to which it appertains to make and use the same.

This invention relates to puzzles; and the object thereof is to provide an improved device of this class which I call the "bird-cage" puzzle and the construction of which is such that the solution thereof is difficult, but may be accomplished by the use of care and skill in the manipulation of the device, a further object being to provide a device of the class specified which is designed to amuse both old and young.

The invention is fully disclosed in the following specification, of which the accompanying drawings form a part, in which the separate parts of my improvement are designated by suitable reference characters in each of the views, and in which—

Figure 3:
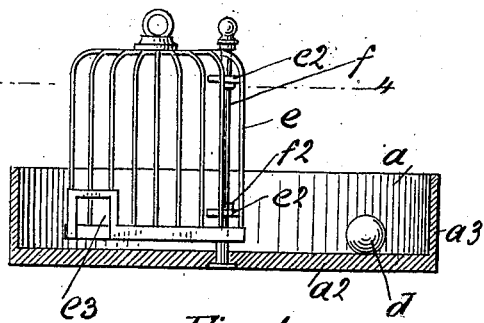
Figure 2:
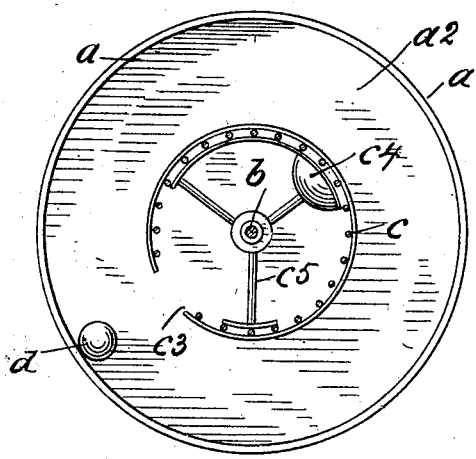

Figure 1 is a sectional side view showing one form of my improved puzzle; Fig. 2, a sectional plan view on the line 2 2 of Fig. 1; Fig. 3, a view similar to Fig. 1, but showing another form of construction; and Fig. 4 a sectional plan view on the line 4 4 of Fig. 3.

In the practice of my invention, as shown in Figs. 1 and 2, I provide a circular box or case $a$, comprising a bottom $a^2$ and an annular wall $a^3$, and secured in the center of the box or case $a$ or in the center of the bottom $a^2$ thereof is a vertical rod $b$, on which is loosely and rotatably mounted a cage $c$, which is made in the form of an ordinary circular bird-cage having a conical top. The top of the cage is provided with a cap or collar $c^2$, through which the rod $b$ passes, and said rod is provided with a collar or other support $b^2$, which supports the cage, and these parts are so attached that the bottom of the cage is free or is supported at a slight distance above the bottom $a^2$ of the box or case $a$. The cage $c$ is provided at the bottom thereof with an open door $c^3$, and directly opposite said door the bottom portion of the cage is provided with a weight $c^4$, and the bottom portion of the cage is also provided with a spider $c^5$, through which the rod $b$ passes, and with this construction it will be apparent that any movement of the box or case will cause the cage to rotate or swing on the rod $b$. I also place in the box or case $a$ a ball $d$, which is free to roll over the bottom of said box or case, and the solution of the puzzle consists in manipulating the device so as to pass the ball through the door $c^3$ into the cage $c$.

Figure 4:
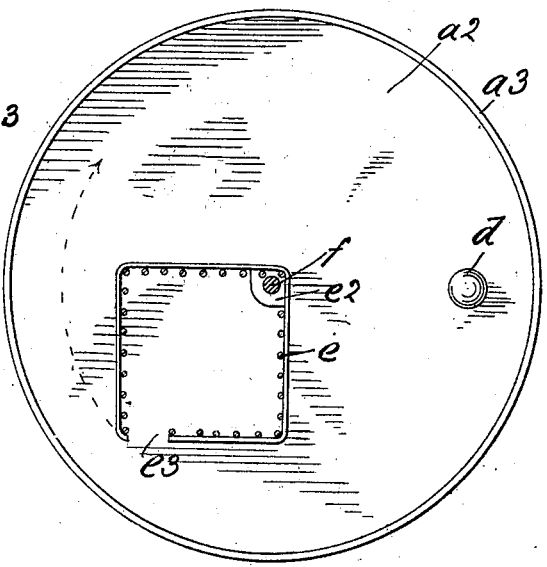

In Figs. 3 and 4 I have shown a modification in which a cage $e$ of angular form is employed, and said cage is provided at one side or in one corner thereof with ears $e^2$, through which is passed a rod $f$, and opposite the corner through which the rod $f$ passes and in one side of the cage and at the bottom thereof is an open door $e^3$. The rod $f$ is provided with a collar or stop $f^2$, on which one of the ears $e^2$ rest, and in this way the cage $e$ is supported with the bottom thereof slightly above the bottom of the box or case $a$. The bottom of the box or case $a$ shown in Figs. 3 and 4 is larger than that shown in Figs. 1 and 2 and is also circular in form; but it will be understood that said box or case may be of any desired shape.

With the construction shown in Figs. 3 and 4 the cage $e$ is eccentrically supported on the rod $f$, or, in other words, said rod is passed downwardly through one corner portion thereof or may be passed downwardly through one side portion thereof or through keepers connected with the corner portion or side portion thereof, the only object in this connection being to have the rod which supports the cage arranged eccentric to the vertical center thereof. With this construction the ball $d$ is also employed, and the solution of the puzzle, as with the construction shown in Figs. 1 and 2, consists in manipulating the device so as to pass the ball through the door $e^3$ into the cage $e$. It will be understood that with any movement of the box or case in any direction the cage $e$ is free to swing at least to an extent, and the ball $d$ is also free to move over the box or case, and the manipulation of said box or case so as to pass the ball $d$ into the cage is a difficult operation, but may be accomplished with the exercise of care and skill on the part of the operator.

With the form of construction shown in Figs. 1 and 2 it will be seen that the weight $c^4$ is the element which causes the cage to swing on the rod $b$ when the box or case is moved in any direction, while the arrangement eccentric of the rod $f$ in the form of construction shown in Figs. 3 and 4 accomplishes the same result.

It will be seen that the operation or movement of the cage depends upon the fact that it is mounted on, supported by, or connected with a vertically-arranged support around which it is free to turn, and the construction is such that the center of gravity of the cage is at one side of the support, and this causes the cage to freely swing on its support whenever the latter is tilted or moved in any direction. Many other forms of construction may be employed for accomplishing the same result, and any suitable device, whether made in the form of a cage or otherwise and provided with a door in the bottom part thereof, may be employed.

Having fully described my invention, what I claim as new, and desire to secure by Letters Patent, is—

1. A device of the class described, comprising a box or case, an upright support secured therein, a cage mounted on said rod and free to rotate thereon and the bottom of which is supported slightly above the bottom of the box or case, said cage being provided in a bottom side portion thereof with a door and in the bottom portion thereof with a weight.

2. A device of the class described, comprising a box or case, an upright support secured therein, a cage mounted on said rod and free to rotate thereon and the bottom of which is supported slightly above the bottom of the box or case, said cage being provided in a bottom side portion thereof with a door and in the bottom portion thereof with a weight which is placed opposite said door.

3. A device of the class described, comprising a box or case having a smooth bottom, a vertically-arranged support placed in said box or case, and a rotatable cage or receiver mounted on said support and provided in the bottom part thereof with a door, the center of gravity of the cage or receiver being on one side of its vertically-arranged support.

4. A device of the class described, comprising a box or case having a smooth bottom, a vertically-arranged support mounted therein, and a cage or receiver loosely mounted on said support and adapted to turn thereon, the center of gravity of the cage or receiver being at one side of the support and said cage or receiver being provided in the bottom thereof with a door.

5. A device of the class described, comprising a box or case having a smooth bottom, a vertically-arranged support mounted therein, and a cage or receiver loosely mounted on said support and adapted to turn thereon, the center of gravity of the cage or receiver being at one side of the support and said cage or receiver being provided in the bottom thereof with a door, and a ball placed in said box or case.

In testimony that I claim the foregoing as my invention I have signed my name, in presence of the subscribing witnesses, this 25th day of June, 1906.

RICHARD M. LEA.

Witnesses:
C. E. MULREANY,
F. A. STEWART.